Sept. 19, 1967    R. J. ORCHARD    3,343,150
LIGHT CAPSULE AND DISPLAY SYSTEM
Filed Jan. 2, 1964    2 Sheets-Sheet 1
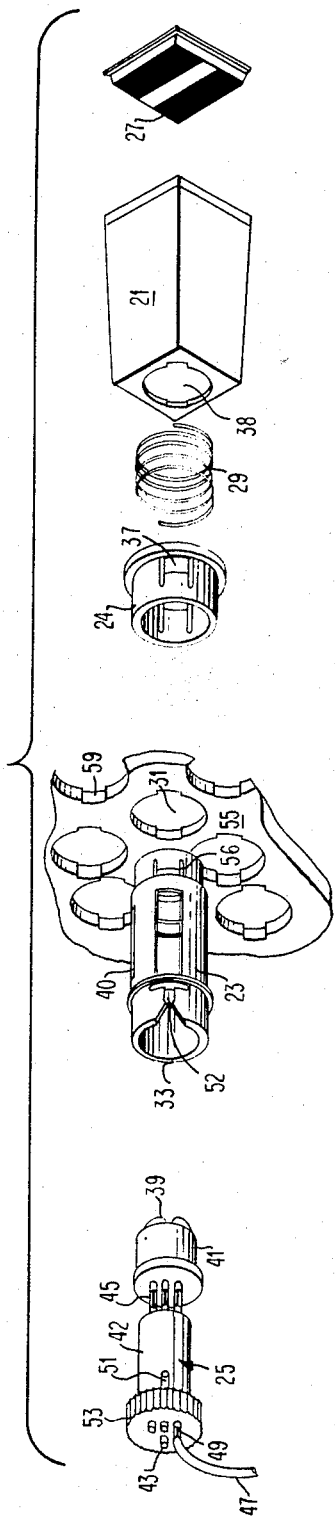
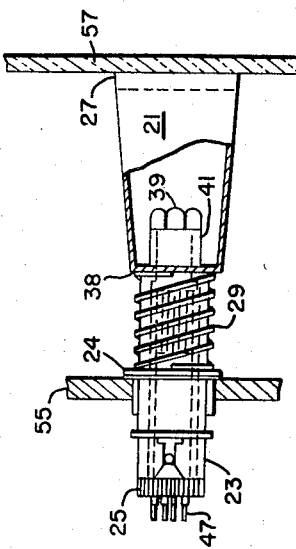
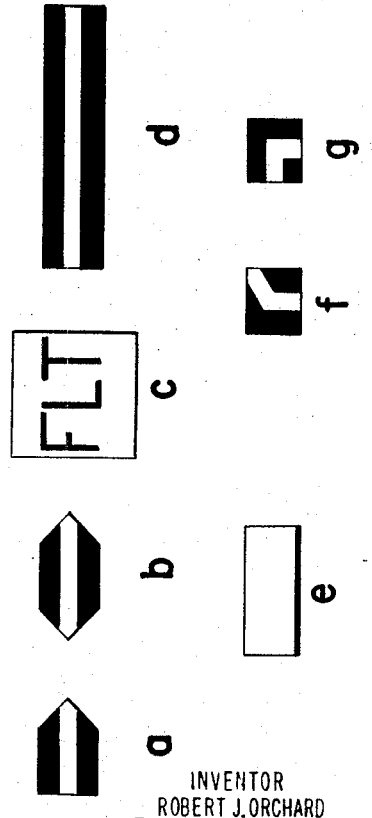
INVENTOR
ROBERT J. ORCHARD
BY
ATTORNEY Sept. 19, 1967 R. J. ORCHARD 3,343,150
LIGHT CAPSULE AND DISPLAY SYSTEM
Filed Jan. 2, 1964 2 Sheets-Sheet 2

United States Patent Office 3,343,150
Patented Sept. 19, 1967

3,343,150
LIGHT CAPSULE AND DISPLAY SYSTEM
Robert J. Orchard, Kingston, N.Y., assignor to International Business Machines Corporation, New York, N.Y., a corporation of New York
Filed Jan. 2, 1964, Ser. No. 335,332
11 Claims. (Cl. 340—225)

ABSTRACT OF THE DISCLOSURE

A system for providing a large board situation display for association with command and control information processing systems. A rear panel of the display board contains a matrix of openings for selective positioning of polychromatic light cells, such cells having varied masks for providing unique display situations such as routes, crossovers, intersections, etc., the cell selection and color being controlled by the associated processor. The front panel of the situation display includes a light transmitting and a light diffusing panel against which the individual light cells are maintained at a constant distance to, when energized, provide a display of uniform intensity.

---

The present invention relates to a multi-color light cell and to a large board display arrangement of such cells.

The use of display systems, particularly large board display systems for providing visual indication of various situations and conditions, is increasing significantly in both military and non-military applications. Such display systems, when combined with control systems such as data processing systems, are suitable for communication network displays, production or process control systems, air, ground or sea traffic control, etc. Large board display systems currently available include electro-luminescent display panels with high element density, multicolor backlighted systems using magnetically operated shutters and flat sandwich gas discharge panels. Such display systems tend to be relatively complex, fixed or inflexible and expensive. In the gas discharge panel, for example, a 10 inch square display may utilize 10,000 tiny neon gas cells, each cell in turn requiring an individual switching circuit.

In accordance with the present invention, there is provided a flexible multi-color display system particularly suitable for large board displays and compatible with existing command and control information processing systems. The invention contemplates a unique light cell design including a pluggable multi-color light cluster and a plurality of suitably masked indicia patterns which are mounted on a display panel in accordance with the specific display desired. The display system includes a light transmitting front panel member composed of a clear plastic behind which is mounted a curtain or screen of translucent light diffusing material and a back panel on which the light cells are assembled in the desired configuration. After the light cells have been assembled into a specific configuration, the entire back panel is moved against the diffusing screen and the light cells are maintained at a constant distance and under uniform pressure against the back of the screen, or alternately the display may be provided without a screen. In assembly, the multicolor or polychromatic light clusters are inserted in the back portion of each individual light cell and wired such that signals may be selectively applied to light the selected lamps under appropriate control circuitry. When tied in with electronic control equipment such as a data processing system, such a display board or panel is capable of displaying a plurality of intersecting or coextensive and distinctly different lines, the display when viewed from the front of the panel being shown as illuminated lines or other indicia of the same or different colors. System advantages include means to rapidly assemble or change a specific pattern on the display board, thus affording a maximum degree of flexibility. The individual light cells, readily assembled and serviceable from the rear of the display panel, include means for maintaining uniform contact against the display panel, thus providing relatively uniform light intensity from each cell on the panel. The cells composed of plastic employ a nominal number of parts contributing to ease and economy of manufacture and assembly. The varied mask patterns permit display of a wide variety of difficult or unique situations such as intersections, crossover, etc., while the polychromatic light cluster eliminates the use of colored light filters and permits a single mask indicia to be displayed in one of a plurality of colors.

Accordingly, a primary object of the present invention is to provide an improved light cell design.

Still another object of the present invention is to provide an improved light cell design including a pluggable multi-colored light cluster.

A further object of the present invention is to provide a light cell design incorporating a variety of interchangeable masks.

Another object of the invention is to provide a flexible display system adapted for ready conversion to any desired configuration.

The foregoing and other objects, features and advantages of the invention will be apparent from the following more particular description of a preferred embodiment of the invention, as illustrated in the accompanying drawings.

In the drawings:

FIGURE 1 is an exploded view of the basic light cell assembly.

FIGURE 2 illustrates a light cell assembly showing the elements of FIGURE 1 in assembled form.

FIGURES 3a through 3g illustrate various mask configurations utilized in the illustrated display pattern.

Figure 4:
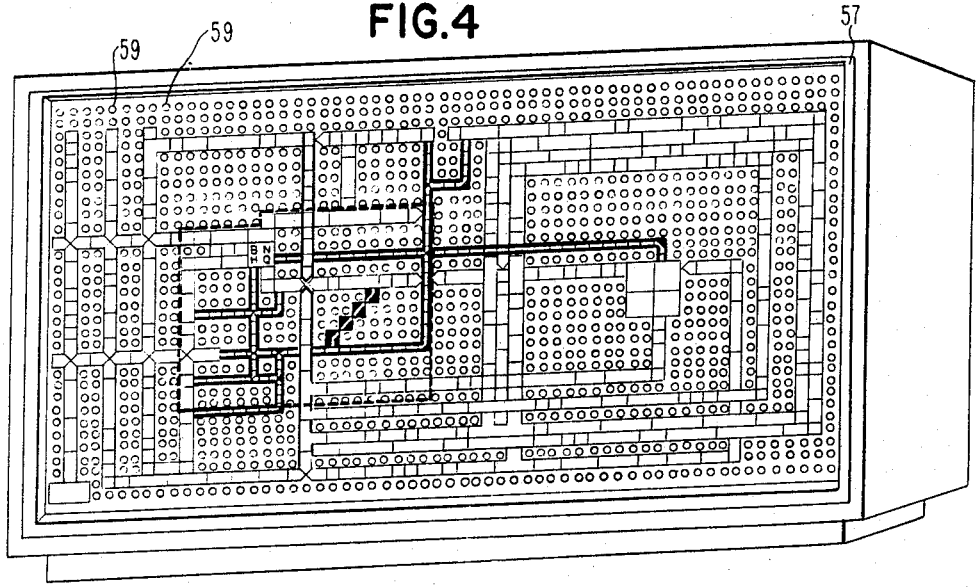
FIGURE 4 illustrates a large board display system constructed in accordance with the principles of the present invention.

Referring now to the drawings and more particularly to FIGURE 1 thereof, the basic display module assembly comprises a truncated pyramidal light cell 21 having a rectangular cross sectional area at any given point, a slide-bushing assembly 23, a snap bushing 24, and a pluggable multi-color light assembly 25. A truncated pyramidal shape is employed to facilitate assembly of a module of light cells by eliminating friction or rubbing which might result from the use of rectangular cells. The front edge 26 of the light cell 21 is open to accept a light mask 27 which may comprise any of various indicia configuration more fully described hereinafter. Masks 27 are readily mounted or removed from the light cell by snap action between the edges 28 of the mask and the front edges 26 of the light cell and are readily interchangeable if desired, from the front of the cell. Each light mask has a translucent area in the form of a specific indicia representation, the translucent area being composed of a light transmitting or light diffusing material, while the non-indicia portion of the mask is opaque. Such transparencies may be made by painting, coating or conventional photographic processes, and either the indicia or its background may be illuminated to provide the desired contrast. For example, for an alphanumeric display indication, the black character may be photographed against a white background and either the resulting negative or positive may be employed, depending on whether the character or its background is illuminated. Any other mask indicia may be similarly fabricated. The inside of the light cell 21 is painted or coated with a light reflecting material to provide maximum illumination therefrom.

The snap bushing 24 snaps into position in the selected opening 31 of back panel 55, the tips 37 of snap bushing 24 fitting within corresponding slots 59 in openings 31. The snap bushing is inserted or removed from the rear of the back panel, which comprises a matrix of uniformly spaced openings 31 extending throughout the entire panel. The slide bushing assembly 23 slides through the snap bushing 24 into the opening 38 in the base of light cell 21. Compression spring 29, comprising an element of the snap bushing assembly, is mounted between snap bushing 24 and light cell 21, and compensates for variations in thickness of steel back panel 55 or the base of light cell 21 by maintaining all light cells in uniform contact against the front panel and thereby ensure substantially uniform light intensity from the individual light cells 21. The compression spring is maintained on the snap bushing by conventional lock washers, not shown. A keyway 40 in slide bushing 23 and the corresponding keyway in snap bushing 24 prevents rotational movement of slide bushing 23 with respect to snap bushing 24.

The light cluster assembly 25 comprise a plurality of lamps 39, a pair of socket members 41 and 42 and support members 45. In the preferred embodiment, the metallic support members also function as current conductors connecting lamp terminals in socket 41 with the input terminals 43 in socket 42. A pair of individual socket members 41, 42 are employed since two subassemblies interconnected as shown are simpler and more economical to fabricate than one large overall assembly. In the preferred embodiment herein described, three lamps colored red, green and amber respectively are employed, although it will be appreciated that the number and color lamps employed are merely a matter of design choice determined by the requirements of the specific display. A miniature lamp and an associated filter are employed rather than colored lamps to provide further economy and maximum flexibility. The short length of the miniature lamps employed a further reason for the dual socket assembly. The socket member 42 includes four input terminals 43 to which the input signal lines 47 are connected through associated taper pin terminals 49. The four input terminals of socket member 42 include one for each of the lamps and a ground terminal. Lockpin 51 in socket member 42 functions to secure the lamp assembly to the corresponding groove 52 in slide bushing 23. When inserted into position, the colored lamps protrude through the slide bushing assembly 23, snap bushing 24 and the base 38 of light cell 21 to the inside of the light cell. The light assembly 25 includes a knurled end 53 to facilitate manual manipulation, i.e., insertion and removal, of the assembly. By mounting on the back panel in this manner, the light cells are readily interchangeable, should the display situation dictate a change, and the cells including the the lamps are readily accessible for servicing. The light cell assembly is composed of a minimum number of parts as compared to any known light cells of the prior art providing economy of manufacturing and servicing.

The light cell package in assembled form is illustrated in FIGURE 2, wherein the component parts are identified by corresponding subscripts. When assembled as shown, compression spring 29, acting against rear panel 55, maintains the light cell 21 and its associated mask in uniform contact against the translucent front panel 57. The assemblies are mounted in selected openings in the large board display in the manner shown in FIGURE 5 and described in greater detail hereinafter.

Referring briefly to FIGURE 3, there are illustrated various mask configurations and light cell geometries used in a typical display. In view of the fact that the configurations are those emploeyd in the selected examples of FIGURES 4 and 5, reference will be made to the specific configurations hereinafter. At this point it will be noted only that the configurations include the standard light cell as a basic modular unit, units having a geometric configuration related directly to this basic unit and special geometric configurations for specific display applications.

Referring now to FIGURE 4, there is illustrated a typical large board display system fabricated in accordance with the teachings of the subject invention. For purposes of illustration, the selected display will be assumed to comprise a communications network which could be coordinated with a map painted on the Plexiglas front panel of the display board. As one specific example, the map could be painted on the Plexiglas panel with ultraviolet paint using different colors to distinguish between land and water masses. When exposed to an ultro-violet light source, the map would become visible, while the display system to be herein described would illustrate communication networks interconnecting selected stations and the status of the various routes comprising such a network.

Figure 5:
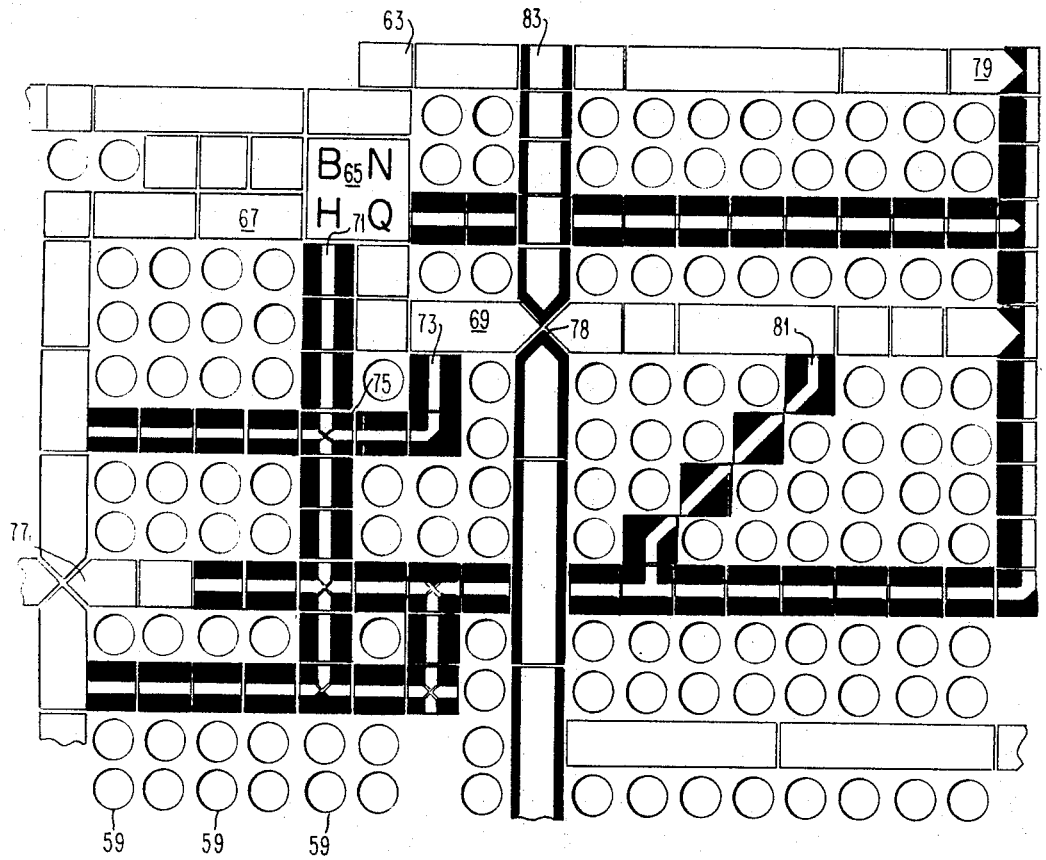
FIGURE 5 illustrates an enlarged view of a section of the large board display shown in FIGURE 4.

To simplify the description of the subject display system, it will be assumed that the front panel is completely transparent, such that the structural arrangement or a front view of portions of the back panel and light cells mounted thereon is afforded by FIGURES 4 and 5. A matrix of uniformly spaced openings 59 of a standard size and shape, such as shown in the back panel arrangement of FIGURE 1, extending throughout the panel. One advantage of the present system is that identical openings may be utilized to mount each light cell irrespective of the geometry of the light cell. This matrix arrangement affords maximum flexibility in that any points on the display board may be readily interconnected through a specified light cell arrangement. Depending on the display information, each light cell will contain an appropriate mask.

Referring back to FIGURE 3, several masks indicative of display information of the type shown in FIGURE 4 are illustrated. The basic or standard light cell configuration is the rectangular module or cube which might be 1″ x 1″. Typical standard modules having mask configurations of 45° and 90° turns are shown in FIGURE 3f and 3g. A larger module which may be 2″ x 2″ is used for displaying alphanumeric information such as station identification or other unique situations and is shown in FIGURE 3c. Examples of unique light cells and masks are the pentagonal single crossover (FIGURE 3a) and the hexagonal double crossover (FIGURE 3b). FIGURE 3d represents a horizontal trunk line which might be 1″ x 4″, for example, and FIGURE 3e represents an indicator which might be 1″ x 2″. For trunk lines, rectangular modules such as 1″ x 4″ with appropirate masks (FIGURE 3d) are utilized. The operational capability of each of the interconnected stations shown in FIGURE 4 is indicated visually by means of color coding. Thus by selection of appropriate masks, any possible communication network can be readily assembled, while the operational capabilities or status of the lines composing the network may be indicated by appropriate color coding. Each of the larger light cells have the facility for a single lamp or multiple lamps are determined by the intensity requirements of the specific display.

Referring now to FIGURE 5, the portion of the display board indicated generally within the area boarded by the heavy dashed line of FIGURE 4 is shown in enlarged form to more clearly illustrate certain details thereof. The modules 63 illustrate the standard 1″ x 1″ light cell, modules 65 represent the 2″ x 2″ module, while 1″ x 2″ modules 67 and 1″ x 4″ modules 72 round out the variety of rectangular module sizes. Communication line 71 emanating at station 65 crosses over intersecting trunk line 73 at module 75. A similar intersection and crossover is shown directly below point 75. It will be readily appreciated that the intersection masking configuration of module 75 and similar modules is suitable only where the intersecting lines are of the same color. When the intersecting lines are of different colors, mask configurations of the type shown in FIGURES 2a and 2b are employed, similar crossovers being shown at 77 and 78. The size of the opaque opening in the mask may be utilized to indicate the relative significance of the line in the overall network. Thus, for example, lines 71 and 73 could represent connecting trunk lines, while lines such as 83 could represent major communication links in the network. If desired the mask opening could be completely opaque as shown by the line starting at light cell 69 and crossing over at intersection 78. In addition to horizontal and vertical communication lines direct connections between communication links may be made in the manner shown by line 81.

From the description above, it will be appreciated that any points on the display board shown in FIGURE 4 can be readily interconnected with a network of light cells having the desired mask configuration. In addition to those shown in the illustrative embodiment, any suitable or desired mask configuration to identify any specific situation may be utilized. As exemplary of a large board display, the display system shown in FIGURE 4 could be 14′ x 8′ divided into two 4′ x 8′ sections and a 6′ x 8′ section using ¾ inch Plexiglas. The rear panel assembly would be composed of sheet metal mounted on hinged gate sections. With the gate sections closed, the spring bias means in each light cell design would compensate for bowing tendencies in large masses of these materials to maintain the light cell in bearing relation against the front panel of the display. The cells are completely accessible from the rear for maintenance, and the specific display situation can be installed or revised completely from the rear without disrupting the display being modified. The display is adaptable to external control as by data processing apparatus, which can specify the status of the individual lines affected and control the display including the specified color based on this determination.

The basic light cell is made of plastic and constitutes a low cost element of high accuracy and long life. By utilizing long-life lamps and operating them at lower than rated voltage, extremely long life and enhanced performance are obtained. The cell is rapidly interchangeable or repairable and the requisite to flexibility is obtained by appropriate selection of masks.

While the invention has been particularly shown and described with reference to preferred embodiment thereof, it will be understood by those skilled in the art that various changes in form and details may be made therein without departing from the spirit and scope of the invention.

What is claimed is:

1. A communication display system comprising a sheet form transparent member having map indicia imprinted thereon,
   a panel member having a multiplicity of apertures arranged in columns and rows and mounted in parallel relation to said sheet form member,
   a plurality of light projector devices mounted in selected ones of said multiplicity of apertures, each of said light projector devices having a light module portion and a light mask portion and including spring bias means operative against said panel member to urge said light mask portion against said sheet form member,
   said light module portions being removable individually without displacement of said spring bias means or said mask means for repair purposes,
   said spring bias means at all times maintaining said light mask portion in bearing relation against said sheet form member and providing yieldability conforming to bowing deformation thereof,
   and control means connected to activate light modules of selected ones of said plurality of devices for defining communication paths with respect to the map indicia on said sheet form member.

2. A display system for providing a large board display comprising in combination a transparent panel member, a second panel member substantially parallel to said transparent panel member and having a plurality of uniformly spaced openings therein,
   a plurality of polychromatic light cells,
   means for selectively attaching said light cells to individual openings in said second panel member to conform to a predetermined display pattern,
   each of said light cells including a cluster of multi-colored lamps,
   control means associated with each of said lamps,
   a plurality of masks,
   means for attaching said masks to associated light cells in accordance with a specific display criteria,
   spring biasing means associated with each light cell for maintaining said light cells in substantial alignment with said transparent panel member to thereby provide substantially uniform illumination therefrom,
   and means for selectively actuating said lamp control means in accordance with the specific configuration to be displayed.

3. A display system comprising in combination a light transmitting panel assembly,
   a light diffusing panel assembly substantially parallel to said light transmitting panel assembly,
   means defining a plurality of openings in a third panel assembly,
   a plurality of polychromatic display indicators selectively mounted in said openings,
   the surface of said indicators including mask members having opaque and transparent portions,
   and means for selectively actuating one of said polychromatic colors for each of said display indicators to thereby provide an overall situation display.

4. A light module assembly comprising in combination a light capsule,
   said light capusule having openings on the front and rear portions thereof,
   a snap bushing assembly adapted for mounting said module on a display panel,
   a slide bushing assembly adapted to fit through said snap bushing into said rear opening of said light capsule,
   a polychromatic light cell assembly adapted for insertion through said bushing assemblies into said light capsule,
   a light mask adapted to fit said front opening of said light capsule,
   and means for maintaining a predetermined spatial relationship between said light capsule and said display panel.

5. A device of the character claimed in claim 4 wherein said light capsule is in the form of a truncated pyramid.

6. A device of the character claimed in claim 4 wherein said means for maintaining a predetermined relationship between said light capsule and said display panel comprises a compression spring mounted between said snap bushing assembly and said light capsule.

7. A device of the type claimed in claim 4 wherein said polychromatic light cell assembly comprises a pair of socket members and a plurality of multi-color lamps,
   the support members connecting said socket members also functioning as conductors of lamp current,
   said socket members also including an input or control terminal for each of said lamps.

8. A device of the character claimed in claim 4 wherein said light mask includes a translucent area in the shape of the indicia to be displayed.

9. A multicolor light indicator assembly for use as a display element comprising in combination a frusto-conical light capsule having a light reflecting inner surface and openings on the front and rear portion thereof, a snap bushing assembly for mounting said indicator on a display panel, a slide bushing assembly interconnecting said snap bushing to said indicator and adapted to fit the rear opening of said light capsule, a multicolor light cluster assembly comprising a pair of socket members, one of said socket members containing a plurality of multi-color lamps, the other of said socket members containing the control terminals for said lamps, a plurality of metalic support members interconnecting said socket members, said support members also functioning as lamp current conductors, means for attaching said light cluster assembly to said slide bushing whereby said lamps protrude through said rear opening of said light capsule, a light mask mounted on said front opening of said light capsule, said light mask having translucent and opaque areas in the configuration of the indicia to be displayed, and compression spring means mounted between said snap bushing and said capsule for maintaining a predetermined spatial relationship between said capsule and said display panel.

10. A display system comprising, a light transmitting panel assembly, a light diffusing panel assembly substantially parallel to said light transmitting panel assembly, a third panel assembly having a plurality of openings therein, a plurality of light module assemblies mounted in selected ones of said openings, each of said light module assemblies comprising in combination a light capsule having openings on the front and rear portions thereof, a snap bushing assembly adapted for mounting said light module assembly in said selected openings, a slide bushing assembly adapted to fit through said snap bushing assembly into the rear opening of said light capsule, a polychromatic light cell assembly adapted for insertion through said bushing assemblies into the light capsule, a light mask adapted to fit over the front opening of the light capsule, and means for maintaining a predetermined special relationship between the light capsule and the light transmitting panel assembly.

11. A device of the character claimed in claim 10 wherein said light capsule is in the form of a truncated pyramid.

References Cited

UNITED STATES PATENTS

| | | | |
|---|---|---|---|
| 2,094,134 | 9/1937 | Obergfell | 340—225 |
| 2,417,043 | 3/1947 | Blewett et al. | 340—225 |
| 2,522,098 | 9/1950 | Coste | 340—225 X |
| 2,764,751 | 9/1956 | Gnadke | 340—225 |
| 2,804,607 | 8/1957 | Nalle | 340—225 |
| 3,056,121 | 9/1962 | Jackson | 340—225 |
| 3,103,659 | 9/1963 | Edwards | 340—378.1 |
| 3,113,303 | 12/1963 | Blomquist et al. | 340—378.1 |

NEIL C. READ, *Primary Examiner.*

R. M. ANGUS, D. L. TRAFTON, *Assistant Examiners.*